United States Patent [19]

Shelton

[11] 4,408,771

[45] Oct. 11, 1983

[54] HIGH PRESSURE SEALING CONNECTION WITH METAL SEAL

[75] Inventor: William S. Shelton, Houston, Tex.

[73] Assignee: ACF Industries, Incorporated, New York, N.Y.

[21] Appl. No.: 448,143

[22] Filed: Dec. 9, 1982

[51] Int. Cl.³ ............................................. F16J 15/08
[52] U.S. Cl. .................. 277/206 R; 277/208; 277/212 C; 277/236; 277/27
[58] Field of Search ............... 277/12, 32, 3, 27, 205, 277/206 R, 207 R, 208, 212 R, 212 C, 236

[56] References Cited

U.S. PATENT DOCUMENTS

| | | | |
|---|---|---|---|
| 2,211,983 | 8/1940 | Parris | 277/206 X |
| 2,898,000 | 8/1959 | Hanny | 277/206 X |
| 3,323,805 | 6/1967 | Legarra | 277/236 X |
| 3,345,078 | 10/1967 | Bialkowski | 277/207 X |

FOREIGN PATENT DOCUMENTS

| | | | |
|---|---|---|---|
| 1180202 | 10/1964 | Fed. Rep. of Germany | 277/212 C |
| 677663 | 8/1952 | United Kingdom | 277/206 |
| 724810 | 2/1955 | United Kingdom | 277/205 |

Primary Examiner—Robert S. Ward, Jr.
Attorney, Agent, or Firm—Marvin J. Marnock

[57] ABSTRACT

A high pressure sealing connection for sealing between connected coaxially aligned members (22, 10). The connection comprises a metallic sealing ring (40) having annular end surfaces (52, 53) adjacent each end and tapering outwardly therefrom. The ring at its largest external diameter is provided with a cylindrical surface (51) intermediate the frusto-conical sealing surfaces (52, 53). At its inner periphery, upper and lower flanges (61, 62) extend inwardly and perpendicularly to the axis of the ring. The coaxially aligned members (22, 10) are provided with recesses defined by opposed internal frusto-conical sealing surfaces (41, 42) at their adjoining ends, each tapering inwardly from the end of the member to an annular shoulder (43, 44) in the bore of the aligned member. The frusto-conical surfaces (41, 42) are of equal taper in the range of 5° to 20° and there is a mismatch of one-half degree to one and one half-degrees with the taper of the frusto-conical surfaces (52, 53) of the sealing ring when the ring is positioned in the recess. Drawing the coaxially aligned members together by suitable means (31) results in a compression of the ring and a sealing relationship between the ring and the aligned members which is enhanced by fluid pressure energization. A clearance gap between the upper and lower surfaces (56, 54) of the ring and the aligned members avoids axial compression of the ring (40). The internal flanges (61, 62) significantly increase the elastic zone of the ring to include the flanges themselves which continue to urge the seal ring in sealing engagement with the aligned members even after high pressure or temperatures have caused a deformation of the sealing ring or the aligned members.

6 Claims, 3 Drawing Figures

HIGH PRESSURE SEALING CONNECTION WITH METAL SEAL

BACKGROUND OF THE INVENTION

This invention relates to high pressure sealing joints or connections and more particularly to an annular bore seal for sealing between first and second coaxially aligned members having opposed frusto-conical sealing surfaces tapering inwardly from their adjoining ends.

With bore seals for connectors, the sealing may be achieved by crushing or yielding the sealing element, or by elastically loading a flexible sealing element generally by utilizing a soft coating on the seal surface or by a combination of both. The seals, in some instances, are pressure energized as determined by their design and relationship with the elements to be connected. Under conditions of high pressure and high temperatures, most bore seals fail to maintain sealing capability on repeated use due to an absence or loss of elasticity under these conditions. The combination of high pressure and temperature causes an expansion of the sealing element and a tendency of the sealing element to rebound when pressure is removed. Also, such sealing elements are hardly ever reuseable because of the high degree of permanent deformation and large plastic zones which render their elements susceptible to embrittlement when exposed to hydrogen sulfide.

The present invention has, as its primary object, the provision of a high pressure bore seal with a unique metallic sealing ring which maintains elasticity at its sealing surface areas and the ability to maintain a fluid-tight seal under high pressure and high temperature conditions. It is also an object to provide a bore sealing connection which provides a seal under atmospheric pressure and temperature conditions but is pressure energizable to provide enhanced sealing capability under high pressure and high temperature conditions. A further object is to provide a bore seal which is less susceptible to hydrogen sulfide embrittlement.

The invention which is a high pressure sealing connection for sealing between connected first and second coaxially aligned members comprises a metallic sealing ring having annular end surfaces at opposite ends thereof and frusto-conical outer sealing surfaces adjacent each of the end surfaces and tapering outwardly therefrom. The ring at its largest external diameter is provided with a cylindrical surface intermediate the frusto-conical sealing surfaces. At its inner periphery, the ring is formed with upper and lower flanges which extend inwardly in a substantially perpendicular relationship to the axis of the ring. The coaxially aligned members are provided with end recesses defined by opposed internal frusto-conical sealing surfaces at their adjoining ends, each tapering inwardly from the end of the member and terminating at an annular radial shoulder formed by an enlargement of the bore of the aligned member. The internal frusto-conical sealings are of equal taper in the range of 5° to 20° and there is a mismatch in the range of one-half degree to one and one-half degrees with the taper of the frusto-conical surfaces of the metallic sealing ring when the ring is positioned in the recesses. In unloaded condition, the initial contact of the sealing ring with the coaxially aligned members is along the upper and lower edges of the sealing ring frusto-conical surfaces. Drawing the coaxially aligned members by suitable means results in a compression of the ring which effects a fluid sealing relationship between the adjacent tapered surfaces of the ring and the aligned members which is enhanced by fluid pressure energization. The dimensions are such that a clearance gap exists in the upper and lower surfaces of the ring and the aligned members. The internal flanges of the ring significantly increase the elastic zone of the ring which includes the flanges themselves and extends from the end surfaces of the ring between plastic zones located intermediate the end surfaces and adjacent the inner and outer peripheries of the ring to provide elastic end portions of the ring. The elastic flanges continue to urge the seal ring in its sealing engagement with the aligned members even after high pressure or temperatures have caused some deformation of the sealing ring or the aligned members.

DESCRIPTION OF A PREFERRED EMBODIMENT

Figure 1:
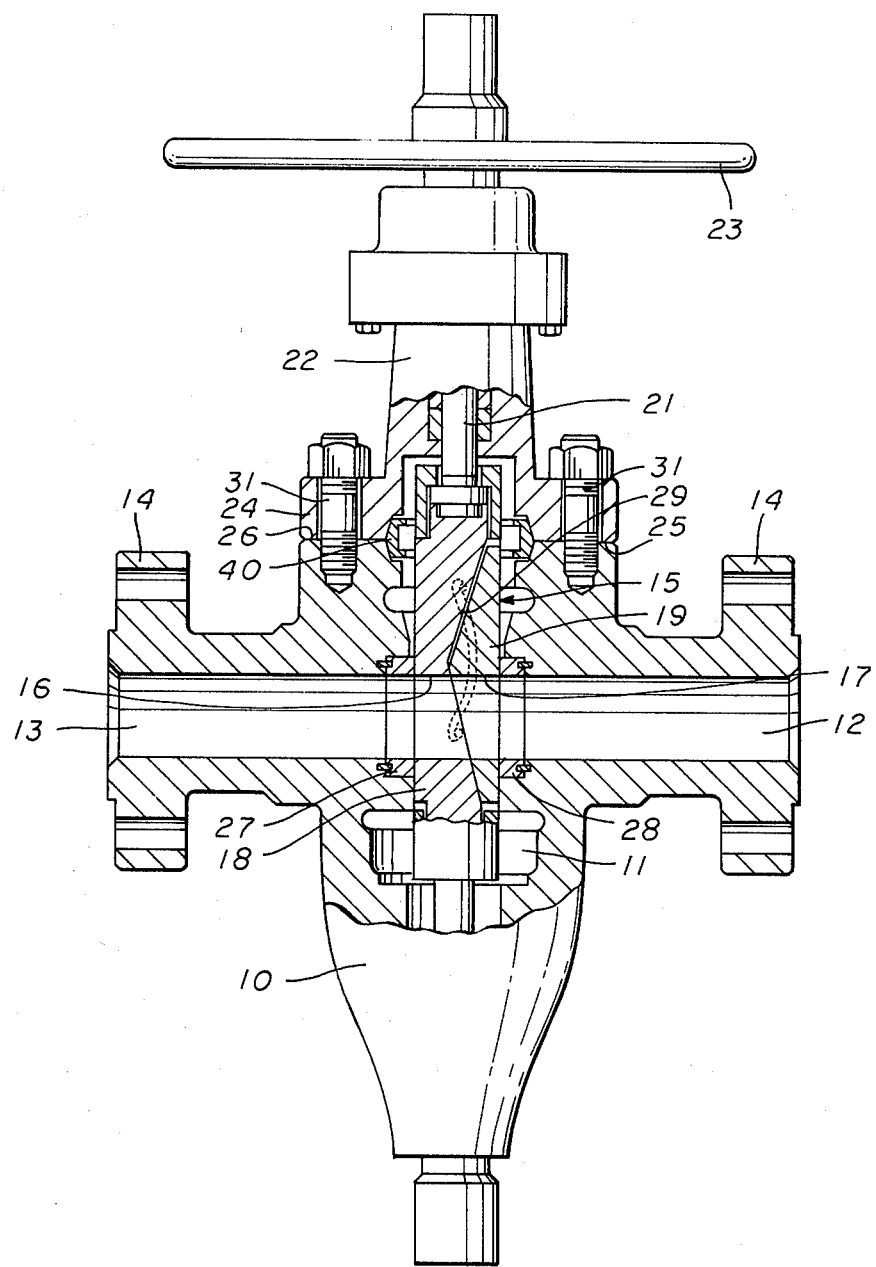
FIG. 1 is a sectional view of an expansible gate valve with the upper portion of the valve shown in elevation and utilizing an annular seal member in accordance with a preferred embodiment of the invention for effecting a fluid-tight seal between the valve bonnet and the valve body.

Referring to the drawings in greater detail, the invention is illustrated herein in connection with a gate valve which utilizes the principle of parallel expanding gates for obtaining a positive mechanical seal on the upstream and downstream sides of the gate assembly. The valve in FIG. 1 which illustrates a typical application of the high pressure sealing connection of this invention includes a valve body 10 provided with a valve chamber 11 and inlet and outlet flow passages 12 and 13 which are in fluid communication with the valve chamber 11 to form a flow way through the valve. Flanges 14 at the ends of the valve body provide means for connecting the valve in a flowline.

Within the valve chamber 11 a gate assembly 15 is mounted for sliding movement transversely of the flow passages to open or close the flow way. The gate assembly 15 comprises a gate member 18 and a segment 19. The gate member 18 is connected at its upper end to a valve stem 21 which extends through the valve bonnet 22 which is bolted atop the valve body 10 and closes the upper end of the valve chamber 11. At its upper end the stem 21 is provided with a valve actuating handwheel 23. The valve shown is of the rising stem type and the stem 21 is connected to the gate member 18 so that upon rotation of the handwheel and the stem, the gate assemby is prevented from rotation but is movable across the flow way to open or close the valve. In the valve open position, ports 16, 17 in the gate and segment members, respectively, are aligned in registry with the inlet and outlet passages 12 and 13.

As is typical of expansible gate assemblies, the gate member 18 is provided with a V-shaped recess which accommodates the wedge shaped segment 19, the wedge faces of which conform to the surfaces of the V-shaped recess and are in contact therewith. Also, characteristically, the linear movement of the gate assembly to open or close the valve causes an expansion of the gate assembly in both its open and closed positions due to relative sliding movement between the gate and segment members 18 and 19 as induced by suitable stops (not shown) in the valve chamber 11 for limiting the vertical movement of the segment 19 relative to the gate 18. When in expanded condition, the gate assembly seals against seat rings 27 and 28 mounted in annular recesses which surround the flow passages 12 and 13 and open to the valve chamber 11. The gate assembly 15 is also provided with a biasing means such as a pair of bow springs 29 which are fixed to the sides of the gate assembly and bias the gate assembly towards a collapsed condition wherein the segment member 19 is nested in the V-shaped recess of the gate member 18. Accordingly, when in transit between the open and closed positions the gate assembly 15 is in collapsed contracted condition and the valve chamber 11 is exposed to the flowline pressure.

It is also seen that the bonnet 22 is secured to the valve body by a plurality of studs or bolts 31 which pass through a radial flange 24 on the lower end of the bonnet. The central bore which extends through the bonnet and receives the valve stem 21 is enlarged at the lower end of the bonnet and forms an extension of the valve chamber 11 for accommodating the gate assembly 15. The flat end surface 25 of the bonnet is superimposed against the flat annular surface 26 of the valve body when the bonnet is in bolted engagement atop the valve body 10.

As shown in FIG. 1, the unique metal sealing ring 40 of this invention is installed at the joint between the bonnet 22 and the valve body 10 to effect a fluid-tight seal under all pressure conditions. For purposes of clarity the sealing ring 40 is shown installed between the valve bonnet 22 and the valve body 10 in the condition wherein the bonnet and valve body are not bolted tightly together. It will be seen that the bonnet 22 is provided with an internal groove in its axial bore at the lower end thereof which provides for an internal inward facing frusto-conical surface 41 which tapers inwardly from the lower planar surface 25 of the bonnet and terminates at an annular radial shoulder 43. In the example shown the frusto-conical surface 41 is provided with a taper of approximately 15° corresponding to a cone angle of 30°. In similar fashion the upper end of the valve body 10 is provided with an internal groove opening into the valve chamber 11 and providing an upward facing frusto-conical surface 42 which extends downwardly and inwardly from the upper end surface 26 of the valve body 10. The frusto-conical surface 42 does not extend into the valve chamber but instead terminates at an upward facing radial extending annular shoulder 44. The frusto-conical surface 42 is also provided with a taper of 15° and is therefore symmetrical to the frusto-conical surface 41.

The seal ring member 40 of this invention is provided with an external surface comprising an intermediate cylindrical surface 51 and upper and lower frusto-conical surfaces 52 and 53. The lower frusto-conical surface 53 extends upwardly from the planar lower end surface 54 of the ring 40 and tapers outwardly therefrom at an angle of 14° corresponding to a cone angle of 28°. The upper frusto-conical surface 52 extends downwardly from the planar upper end surface 56 of the ring 40 and extends or tapers outwardly therefrom at an angle of 14° corresponding to a cone angle of 28°. At its interior the ring 40 is provided with a pair of upper and lower inwardly extending radial flanges 61 and 62. The flanges 61, 62 have equal diameters and are separated by the cylindrical surface 63 of the ring which is of a greater diameter than the inner diameters of the flanges 61 and 62.

Figure 3:
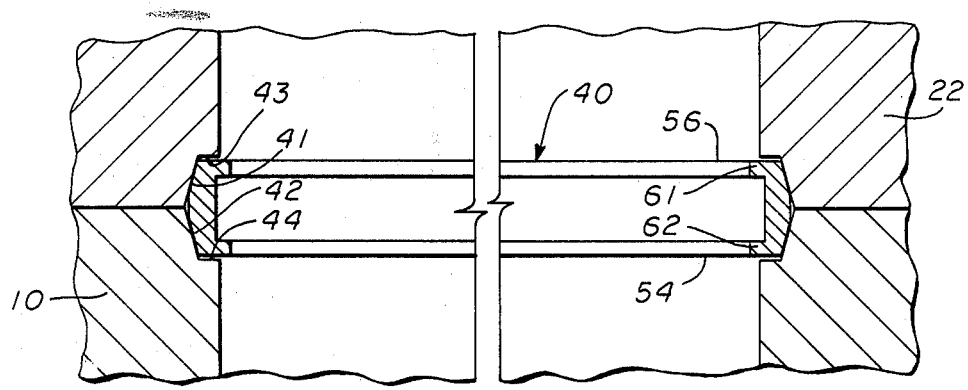
FIG. 3 is a detailed cross-sectional view of the seal ring member of the invention and its relationship with a pair of coaxially aligned tubular members such as the valve bonnet and valve body of FIG. 1 and showing the seal ring member in the condition of effecting a fluid-tight seal therebetween.

In FIG. 3 the metal ring 40 is shown as it is installed to provide a fluid-tight seal between the valve bonnet 22 and the valve body 10 in a manner hereinafter explained. It will be seen in FIG. 3 that the axial dimension of the ring 40 is less than that of the sum of the axial dimensions of the frusto-conical surfaces 41 and 42 of the valve bonnet and the valve body. This provides for a clearance gap between the upper surface 56 of the ring 40 and the downward facing radial shoulder 43 of the valve bonnet 22 and a corresponding clearance between the lower surface 54 of the ring 40 and the upward facing radial shoulder 44 of the valve body 10. Preferably this clearance is in the range of 0.001 inch to 0.015 inches but is shown exaggerated for purposes of illustration. This minimal clearance tends to prevent seal cocking and subsequent unloading at seal tips.

Figure 2:
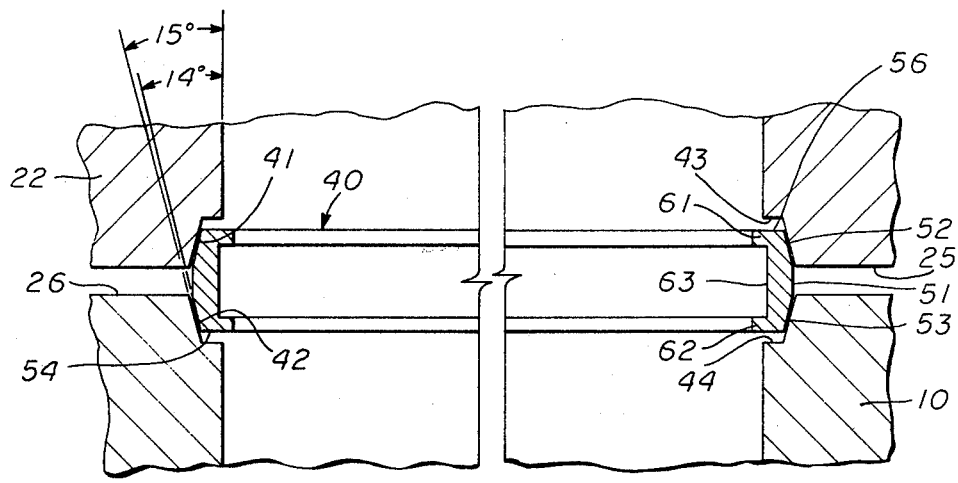
FIG. 2 is a detailed cross-sectional view of the seal ring member of the present invention and its relationship with the valve members shown in FIG. 1 prior to boiling of the valve bonnet to the valve body.

From the description above it will be noted that there is a one degree mismatch between the tapers of the frusto-conical surfaces of the ring and the frusto-conical surfaces of the valve bonnet and valve body. Accordingly, it will be seen in FIG. 2 that in the unloaded condition, the initial point of contact between the ring and the valve bonnet and valve body is at the upper and lower annular edges of the ring wherein its frusto-conical surfaces 52 and 53 make contact with the frusto-conical surfaces 41 and 42 of the bonnet and valve body, respectively. When torque is applied to the bonnet bolts 31 the one degree of angle mismatch causes a very high stress line contact at the annular seal edges. Clearances between the ring and the valve bonnet and valve body operate to keep the ring centralized and allow the seal to align itself with these members. Finite element analysis has shown that the flanges or nubs 61 and 62 on the internal diameter of the ring 40 are very elastic and continue to urge the seal tips or corners of the ring toward the valve body and the valve bonnet even after high pressure or thermal cycles have slightly deformed the sealing members. When compressed as shown in FIG. 3, the elastic zone of the ring extends from its upper annular surface 56 to its lower annular surface 54 and between the plastic zones of permanent deformation which are confined to an area immediately behind the external cylindrical surface 51 of the ring and a second area immediately adjacent the inner cylindrical surface 63.

It has been demonstrated that when the valve chamber 11 is subjected to very high fluid pressures the sealing ring 40 expands in diameter and the inwardly extending flanges 61 and 62 are flexed or bent toward one another. The flanges or nubs 61 and 62 because of their elastic nature in effect keep the contact between the ring and the bonnet and valve body members loaded. The flexing forces exerted by the ring against the internal frusto-conical surfaces of the valve bonnet and valve body are substantially perpendicular thereto. In this respect, it is essential that the inner flanges 61, 62 extend substantially radially and perpendicularly towards the axis of the ring.

It is also to be noted that the seal is pressure energized since the area of the inner peripheral surface of the ring which is acted on by fluid pressure is substantially larger than the areas of contact of the frustoconical surfaces of the ring and the coaxial members. Accordingly, the countering forces applied to the frusto-conical surfaces of the ring are applied in smaller areas and fluid-tight sealing is established. Also, the relatively larger elastic zones in the sealing ring increases the reuseability of the ring and the correspondingly smaller plastic zones of the ring render it far less susceptible to hydrogen sulfide embrittlement than conventional bore seals.

It is to be understood that the foregoing description of a preferred embodiment of the invention has been presented for purposes of illustration and description and is not intended to limit the invention to the precise form disclosed. For example, while an angle of taper of 15° is disclosed for the internal frusto-conical surfaces of the coaxially aligned members, a taper in the range of five degrees to twenty degrees is acceptable depending on the particular application. Furthermore, mismatch between the mating frusto-conical surfaces of the seaing ring and the coaxial aligned members can vary in the range of one-half degree to one and one-half degrees. Furthermore, while the invention has been illustrated as part of a gate valve construction, it is also suitable for use as a high pressure connection in a wellhead assembly or in pipelines generally. It is to be appreciated therefore, that changes may be made by those skilled in the art to suit particular applications of the invention without departing from the spirit of the invention.

What is claimed is:

1. A metallic sealing ring for sealing between connected first and second coaxially aligned and centrally bored members having opposed frusto-conical surfaces at their joined ends, said sealing ring having upper and lower annular end surfaces which reside in planes transverse to the axis of the sealing ring;
    an external peripheral surface comprised of a central circular cylindrical surface, a lower frusto-conical surface extending from said lower annular end surface to said circular cylindrical surface in a downwardly convergent coaxial relationship with said sealing ring;
    an upper frusto-conical surface extending downwardly from said upper annular end surface to said circular cylindrical surface in an upwardly convergent coaxial relationship with said sealing ring; and
    upper and lower radial flanges extending into the interior of said ring at the upper and lower ends of said sealing ring, respectively, said sealing ring having an enlarged bore section as defined by a central inner peripheral surface intermediate said upper and lower radial flanges and extending therebetween, and said sealing ring being adapted to be received in the bores of said coaxially aligned members for effecting a fluid-tight pressure energizable sealing relationship with the opposed frusto-conical surfaces of the coaxially aligned members.

2. A metallic sealing ring as described in claim 1 wherein the enlarged bore section of the sealing ring is defined by a cylindrical surface coaxial with the axis of the sealing ring.

3. A metallic sealing ring as described in claim 1 wherein said upper and lower frusto-conical surfaces are of equal taper in the range of 5° to 20°.

4. A high pressure sealing connection for sealing between connected first and second coaxially aligned members which are provided with central bores and are subjectable to high fluid pressures therein, said first and second aligned members being each provided with an internal annular recess at the end thereof which is connected adjacent to the other of said members, each said recess being defined by an internal frusto-conical sealing surface tapering inwardly from the end of the member and terminating at an annular radial shoulder formed by an enlargement of the bore in said member;
    a metallic sealing ring for sealing between said connected first and second coaxially aligned members when positioned in said recesses, said sealing ring having an external diameter which exceeds the bore diameter of the coaxially aligned members measured at their adjoining ends and upper and lower annular end surfaces which reside in planes transverse to the axis of the sealing ring, said sealing ring having;
    an external peripheral surface comprised of a central circular cylindrical surface, a lower frusto-conical surface extending from said lower annular end surface to said circular cylindrical surface in a downwardy convergent coaxial relationship with said sealing ring at an angle of taper which is in the range of one-half to one and one-half degrees less than the taper of the internal frusto-conical sealing surface of said second aligned member;
    an upper frusto-conical surface extending downwardly from said upper annular end surface to said circular cylindrical surface in an upwardly convergent coaxial relationship with said sealing rings at an angle of taper which is in the range of one-half to one and one-half degrees less than the taper of the internal frusto-conical sealing surface of said first aligned member whereby when said metallic sealing ring is positioned in said annular recesses the upper and lower annular edges of the upper and lower frusto-conical surfaces respectively of the metallic sealing ring provide the only points of engagement with the internal frusto-conical seating surfaces of the coaxially aligned members;
    upper and lower radial flanges extending into the interior of said ring at the upper and lower ends of said sealing ring, respectively, said sealing ring having an enlarged bore section as defined by a central inner peripheral surface intermediate said upper and lower radial flanges and extending therebetween; and
    means for drawing said coaxially aligned members together to apply a compressive force on said sealing ring for effecting a fluid sealing relationship between the tapered surfaces of the sealing ring and the tapered surfaces of the coaxially aligned members which is enhanced by fluid pressurization within the coaxially aligned members.

5. A high pressure sealing connection as recited in claim 4 wherein said first and second coaxially aligned members are the valve bonnet and valve body of a high pressure valve.

6. A high pressure sealing connection as recited in claim 4 wherein said internal frusto-conical sealing surfaces of the first and second coaxially aligned members are provided with an equal angle of taper in the range of 5° to 20°.

* * * * *